(12) United States Patent
Sun

(10) Patent No.: US 12,545,869 B2
(45) Date of Patent: Feb. 10, 2026

(54) METHOD AND DEVICE FOR ADHERENT CULTURE OF MICROALGAE IN THIN LIQUID LAYER BY MOBILE MECHANICAL STIRRING

(71) Applicant: Xuyang Sun, Zhejiang (CN)

(72) Inventor: Xuyang Sun, Zhejiang (CN)

(*) Notice: Subject to any disclaimer, the term of this patent is extended or adjusted under 35 U.S.C. 154(b) by 890 days.

(21) Appl. No.: 17/768,051

(22) PCT Filed: Jul. 29, 2020

(86) PCT No.: PCT/CN2020/105340
§ 371 (c)(1),
(2) Date: Apr. 11, 2022

(87) PCT Pub. No.: WO2021/068604
PCT Pub. Date: Apr. 15, 2021

(65) Prior Publication Data
US 2024/0093132 A1 Mar. 21, 2024

(30) Foreign Application Priority Data

Oct. 11, 2019 (CN) .......................... 201910962674.2

(51) Int. Cl.
*C12M 1/00* (2006.01)
*C12M 1/06* (2006.01)
(Continued)

(52) U.S. Cl.
CPC ............ *C12M 21/02* (2013.01); *C12M 23/04* (2013.01); *C12M 23/18* (2013.01); *C12M 27/06* (2013.01);
(Continued)

(58) Field of Classification Search
None
See application file for complete search history.

(56) References Cited

U.S. PATENT DOCUMENTS

2008/0009055 A1* 1/2008 Lewnard ................ C10G 1/002
435/292.1
2010/0178686 A1 7/2010 Mena Mas
(Continued)

FOREIGN PATENT DOCUMENTS

CN 101948740 A 1/2011
CN 103421677 A 12/2013
(Continued)

OTHER PUBLICATIONS

International Search Report from International Application No. PCT/CN2020/105340 mailed Oct. 26, 2020.

*Primary Examiner* — William H. Beisner
(74) *Attorney, Agent, or Firm* — Shih IP Law Group, PLLC

(57) ABSTRACT

A method and a device for adherent culture of microalgae in a thin liquid layer by mobile mechanical stirring, comprising: a subsystem for adherent culture of microalgae in thin liquid layer, for adherent culture of microalgae in a culture solution, comprising a microalgae liquid pool and a culture plate used as a base plate for microalgae seed inoculation, adherent culture, microalgae harvesting, the microalgae liquid pool containing culture solution having a water layer with a depth in a range of 1~5 cm, forming a thin liquid layer; and a subsystem for mechanical stirring, comprising a mechanical stirring assembly, a moving assembly, a track member, a power drive assembly, a control assembly, the moving assembly moving on the track member to drive the mechanical stirring assembly to stir and suspend the microalgae, the microalgae standing and gradually settling to the bottom after stirring, realizing adherent culture in suspension and settlement cycle.

5 Claims, 2 Drawing Sheets

(51) Int. Cl.
*C12M 1/12* (2006.01)
*C12M 1/34* (2006.01)
*C12N 1/12* (2006.01)

(52) U.S. Cl.
CPC ............ *C12M 31/08* (2013.01); *C12M 31/10* (2013.01); *C12M 37/00* (2013.01); *C12M 41/42* (2013.01); *C12M 47/02* (2013.01); *C12N 1/12* (2013.01)

(56) References Cited

U.S. PATENT DOCUMENTS

2015/0125946 A1     5/2015   Cong et al.
2016/0360715 A1*   12/2016   Sherlock ................ C12M 45/02
2017/0321179 A1*   11/2017   Hazlebeck ............... C12N 1/12

FOREIGN PATENT DOCUMENTS

| | | | | |
|---|---|---|---|---|
| CN | 203890355 U | | 10/2014 | |
| CN | 105002086 A | | 10/2015 | |
| CN | 204824851 U | | 12/2015 | |
| CN | 106906123 A | | 6/2017 | |
| CN | 207193252 U | | 4/2018 | |
| CN | 207811737 U | * | 9/2018 | |
| CN | 209940606 U | | 1/2020 | |
| CN | 110846211 A | | 2/2020 | |
| JP | 2000228975 A | * | 8/2000 | ............ C12M 21/02 |
| JP | 2019071867 A | | 5/2019 | |
| SU | 345907 A1 | | 2/1973 | |
| WO | WO-2010115944 A1 | * | 10/2010 | ............... A01G 7/02 |
| WO | WO-2015108279 A1 | * | 7/2015 | ............ C12M 21/02 |
| WO | 2017190504 A1 | | 11/2017 | |

* cited by examiner

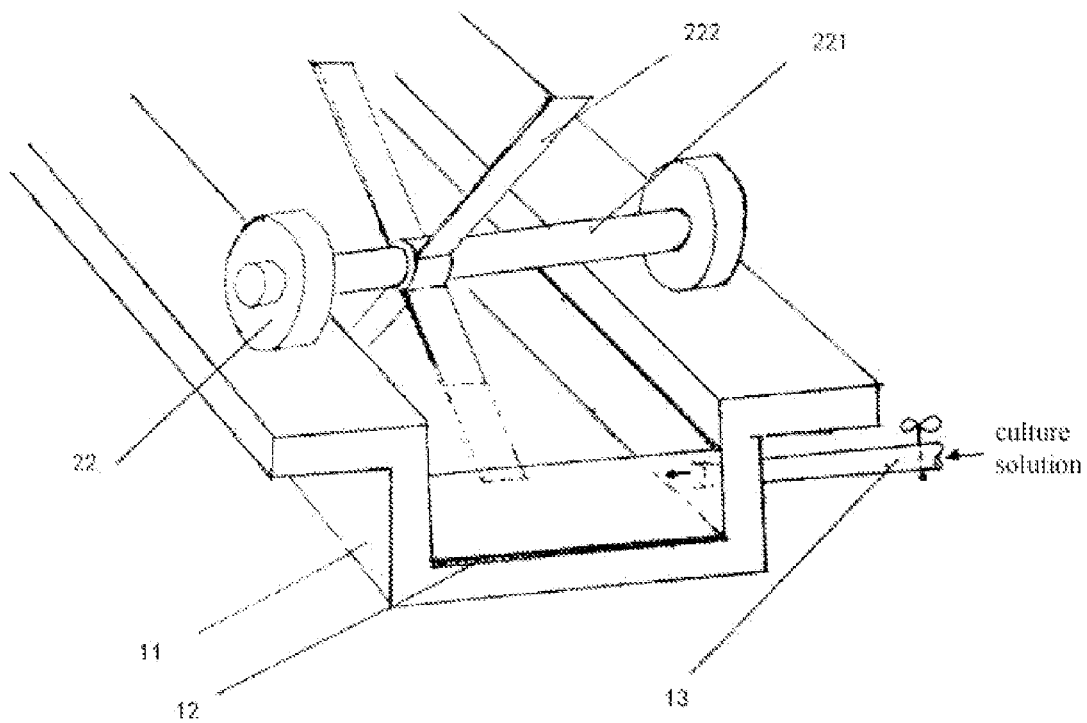

Fig 2

| inoculating the microalgae seed on the culture plate mounted in the microalgae liquid pool, and adding the culture solution, the culture solution has a water layer with a depth in the range of 1~5 cm | S1 |

↓

| mechanically stirring the culture solution at set time intervals, so that the microalgae are stirred and suspended, and after restoration of standing condition, the microalgae are concentrated near the culture plate, thereby carrying out adherent culture | S2 |

↓

| adding the culture solution during the daytime, the depth of the thin liquid layer being controlled within the range, and stop adding the culture solution at night | S3 |

Fig 3

METHOD AND DEVICE FOR ADHERENT CULTURE OF MICROALGAE IN THIN LIQUID LAYER BY MOBILE MECHANICAL STIRRING

This application claims the priority of the Chinese patent application submitted to the Chinese Patent Office on Oct. 11, 2019, with application No. 201910962674.2 and invention title "Method and device for adherent culture of microalgae in thin liquid layer by mobile mechanical stirring", the entire contents of which are incorporated herein by reference.

TECHNICAL FIELD

The present disclosure relates to the technical field of microalgae culture, and more particularly, to a method and a device for adherent culture of microalgae in a thin liquid layer by mobile mechanical stirring.

BACKGROUND ART

Microalgae plants have simple structure, no differentiation of roots, stems and leaves, and have chloroplasts in cells, which can absorb carbon dioxide for photosynthesis and release oxygen, and 90% of the oxygen in nature is produced by algae; meanwhile, the protein content of algal cells generally exceeds 50%, and some are as high as 80%. In addition, microalgae are also rich in a variety of high-value substances, such as polyunsaturated fatty acids, carotenoids, vitamins and minerals. Therefore, microalgae are widely used in various aspects such as food, health products, cosmetics, bait, feed, environmental protection and bioenergy. In addition, microalgae have great potential for carbon sequestration and treatment of nitrogen-rich/phosphorus-rich wastewater.

The photosynthesis of microalgae has very high efficiency, high biomass yield per unit area, and high final product ratio. For example, as for protein yield (t/ha/a), corn:soybean:high protein microalgae=1.1:0.7:32; as for oil yield (L/ha/a), rape:soybean:high oil microalgae=1190:446: 98500, microalgae are ten times to dozens of times higher than others. However, at present, microalgae production still has higher cost compared with conventional crops, often as high as several to ten times.

At present, there are two types of photo-bioreactors for photoautotrophic culture of microalgae: open type and closed type.

The open type microalgae culture system (runway pool and round pool) has the advantages of simple structure, easy construction, convenient operation and low operating cost. However, the open type pools have many disadvantages: for example, the algal liquid in the open type pools has a depth of about 15~30 cm, the region that can receive sufficient illumination (i.e., the effective optical path length) is only on the surface of the algal liquid, mainly in a depth range of 1~3 cm, and most of algal cells are in a dark region (where the light intensity is lower than the minimum light intensity required for the growth of algal cells) and cannot receive sufficient illumination, as a result, most algal cells cannot perform effective photosynthesis and grow rapidly, and continuous stirring is required for the algal cells to receive light uniformly, in addition, the power consumption is very high, and due to large water body and low algal liquid concentration, most work are ineffective, and the effective ratio of power transmission is only 1/5 or even 1/20; the density of algal cells is relatively low (the density of algal cells is generally less than 1.0 g/L), the harvesting cost is relatively high; it is easily affected by external environmental conditions, the culture conditions are difficult to be controlled, and it is vulnerable to contamination by hostile organisms such as protozoa.

Optical path length and illumination area per unit volume are important factors affecting the performance of the reactor. Generally, the shorter the optical path length and the larger the illumination area per unit volume of algal liquid, the better the performance of the photo-bioreactor, the faster the growth rate of algal cells, and the higher the density of algal cells. Therefore, compared with the open type microalgae culture system, the closed type photo-bioreactor has relatively small optical path length, and has the advantages of larger specific illumination area, stable and controllable culture conditions, fast growth rate of algal cells and high algal cell density. In order to adapt to short optical path of microalgae culture, the development trend is to reduce the diameter (tubular type) or thickness (plate type) of the reactor, for example, the advanced horizontal micro-tubular type photo-bioreactor has a diameter of a single glass tube of 5~6 cm, which is substantially consistent with the effective optical path length. However, under the higher algal cell density in the closed type photo-bioreactor, the attenuation degree of light in the algal liquid increases, and generally only about 1~2 cm of the algal liquid layer can be penetrated. Therefore, the optical path length of the closed type photo-bioreactor is still too large, and under higher algal cell density, some algal cells are still in the dark region and thereby are limited in light, resulting in overall slow growth of algal cells. Meanwhile, a phenomenon that the microalgae grow adherently occurs on the light-facing surface of the microtubule, which further blocks the light. In addition, the investment to the equipment of the closed type photo-bioreactor is huge, and the smaller the pipe diameter, the higher the cost, resulting in high device cost. Even if the closed type photo-bioreactor is cultured for several days or tens of days, the final algal cell density is only 3~5 g/L, and the effective transport ratio is low, as a result, the power consumption is high, which is mainly reflected in high electric power consumption; meanwhile, the smaller the pipe diameter, the greater the resistance consumption, the small pipe diameter increases the resistance, and the frictional resistance of the fluid increases nonlinearly as the pipe diameter decreases, resulting in higher electric power consumption. That is, the attenuation effect of light in water leads to short effective optical path of light in the algal liquid, so that the unit effective transport volume (equivalent to the device cost) is high; meanwhile, the transport resistance is large and the power consumption is very high; in addition to this, the average growth rate of microalgae is still relatively slow, the production efficiency is low; the density of algae is still low, and the harvesting cost is high. The above problems are common problems in the existing microalgae culture system.

In addition to dynamic water transport, some people have proposed not to transport at all, such as a half-dry adherent culture system, For example, Tianzhong LIU, etc. proposed "Half-dry solid state cultivation method used for industrial production of microalgae" (CN 102373156 B). In brief, this method firstly inoculates microalgae cells on solid materials, and keeps the cell population moist by adding a small amount of aqueous solution; under the light irradiation condition, inorganic carbon sources are added to the cell population to enable the growth and metabolism of microalgae cells; finally, dense algae mud is directly harvested. In this method, the light does not need to pass through a long water body, the optical path is short, and the loss of optical energy transmission is greatly reduced; no manual power transportation is required; the device is simple and the cost is low; meanwhile, the dense algal mud can be directly harvested, and the harvesting cost is low. It has been reported that the microalgae cell culture efficiency and unit area yield are 5~10 times higher than those of conventional methods. However, in this method, at any time, only the topmost algal cells of the population receive sufficient light, absorb the nutrient components well, and thereby the cells divide and grow vigorously, while most of the algal cells are severely lack of light irradiation or even completely blocked; meanwhile, since there is no sufficient water body as a solvent and transfer medium for various nutrients (including $CO_2$, inorganic salts), and there is no water body as a buffer system for regulating environment to stabilize the environmental parameters such as pH, temperature, osmotic pressure of the culture solution, the supply of various nutrients is insufficient. Light irradiation sufficiency varies from top to bottom, and nutrient transmission varies from bottom to top, forming a serious contrast. Therefore, although the biological yield is large, most of the algal cells have insufficient growth, poor quality, and a small proportion of high-value nutrients; and cannot avoid bacterial, fungal and protozoa contamination and other external contamination. Therefore, the above culture method has not become a mainstream method.

To sum up, the growth of microalgae requires three basic conditions: cultured in water; sufficient sunlight; and sufficient nutrition. However, the microalgae will settle quickly after standing in the water body, and if there is no power to stir, the microalgae at the bottom cannot receive light. Generally, green plants increase the light receiving area through the extension of branches and leaves, absorb nutrients through the root system, and water and nutrients are naturally transported through the root system and vascular system. Although the efficiency of photosynthesis is low and the proportion of final product is small, it still reduces the cost as a crop.

Therefore, at present, the main problem of high cost of microalgae culture lies in power transport type stirring, including:

First, the attenuation effect of light in water results in a very short effective optical path of light in the algal liquid (only 1~6 cm, depending on light conditions and algae density), as a result, most of the microalgae in the large-scale cultural water do not perform effective photosynthesis.

Second, continuous stirring is required to enable the algal cells to receive light uniformly, in addition, the power consumption is very high, and due to large water body and low algal liquid concentration, most work are ineffective.

If a relatively small water body is used for culturing, as the above analysis of microtubule system, the cost of device is high, the resistance is large and the power consumption is high.

Third, the algal cell density is relatively small, which results in higher harvesting cost.

Most of the stirring described above transport water body by using mechanical power, only a few of the stirring adopt airlift method (there is substantially no industrial application due to poor comprehensive effect).

In addition, the infestation of various pollutants may disrupt the normal growth of microalgae. It is mainly protozoa, fungi, insects and other enemy organisms and dust that do great harm to the microalgae culture in the open type system.

SUMMARY OF THE INVENTION

In view of the above problems, the present disclosure provides a method and a device for adherent culture of microalgae in a thin liquid layer by mobile mechanical stirring, which have simple structure, high-density, high-quality and high-efficiency, can reduce the depth of microalgae liquid and increase the light receiving area of microalgae liquid in the process of photoautotrophic culture of microalgae, and can not only enable algal cells to receive sufficient space illumination to have fast growth speed and good growth quality, but also has very low power consumption, low device cost and low harvesting cost.

According to an aspect of the present disclosure, there is provided a device for adherent culture of microalgae in a thin liquid layer by mobile mechanical stirring, including:
  a subsystem for adherent culture of microalgae in thin liquid layer, used for adherent culture of microalgae in a culture solution, and including an microalgae liquid pool and a culture plate, wherein the culture plate is used as a base plate for microalgae seed inoculation, adherent culture and microalgae harvesting, the microalgae liquid pool accommodates the culture solution, and the culture solution has a water layer with a depth in a range of 1~5 cm, which forms the thin liquid layer;
  a subsystem for mechanical stirring, including a mechanical stirring assembly, a moving assembly, a track member, a power drive assembly, and a control assembly, the moving assembly moves on the track member to drive the mechanical stirring assembly to stir and suspend the microalgae, and the microalgae stand and gradually settle to bottom after stirring, thereby realizing adherent culture in a cycle of suspension and settlement.

In an embodiment, the device further includes:
  an subsystem for auxiliary microalgae culture, including a inoculation device for microalgae seed inoculation, a filtration and drainage device for concentration and harvesting of microalgae liquid, a shielding device for shielding and enclosing of microalgae liquid pool, a fan device for ventilation and air replenishment of microalgae liquid pool, a water atomization device for cooling and heating of microalgae liquid pool, a cleaning device for cleaning and sterilizing of microalgae liquid pool, a purification device for treatment and recycling of remaining culture solution, and a detection device for measurement and inspection of microalgae fluid or/and culture solution.

In an embodiment, the mechanical stirring assembly includes one or both of a rotating blade stirring assembly and a fixed blade stirring assembly, the rotating blade stirring assembly includes a shaft on which a blade group is mounted, rotation of the shaft drives blades of the blade group to rotate to realize stirring in a overturn form of microalgae in the microalgae liquid pool, and the fixed blade stirring assembly includes a shaft and a blade group fixed on the shaft, and blades of the blade group are in shovel shapes with size thereof increases from top to bottom, or a straight strip shape with the same from top to bottom, and the shaft and the blade group on the shaft are driven by the moving assembly to realize stirring of microalgae in a horizontal propulsion form in the microalgae liquid pool.

In an embodiment, the microalgae liquid pool is a straight track microalgae liquid pool which includes a straight pool track with a length-width ratio greater than 5, or the microalgae liquid pool is a racetrack microalgae liquid pool which includes two straight pool tracks with a length-width ratio greater than 5 and two turning tracks at ends thereof, or the microalgae liquid pool is a circular pool.

In an embodiment, the structural material of the microalgae liquid pool includes one or more of concrete, glass, plexiglass, steel, aluminum alloy, plastic, wood, waterproof rubber cloth and fiberglass board.

The culture plate may be divided into two types, one is an independent loading and unloading type culture plate, which fixes the culture plate on the microalgae liquid pool through a mounting member, the material thereof is selected from one or more of glass, plexiglass, steel, aluminum alloy, plastic, waterproof rubber cloth and polymer fiber fabric material, and the other is a culture plate directly using a bottom plate structure of the microalgae liquid pool.

In an embodiment, the track member includes one or more of a guide rail, a rack and a chain, the moving assembly includes one or more of a self-driven type moving assembly, a traction type moving assembly, and a rack/chain transmission type moving assembly, wherein the self-driven type moving assembly includes a roller, a motor and a speed transmission device, the motor and the speed transmission device directly drive the roller to drive the mechanical stirring assembly to move on the guide rail mounted on the microalgae liquid pool; the traction type moving assembly includes a traction belt, the traction belt pulls the mechanical stirring assembly to move or pulls the mechanical stirring assembly with a roller to roll on the guide rail through a windlass; the rack/chain transmission type moving assembly includes a motor, which drives the rack/chain and thereby drives the mechanical stirring assembly with a gear to move.

In an embodiment, the control assembly is used to control a movement speed of the moving assembly and a stirring speed of the mechanical stirring assembly according to set conditions, and the set conditions include one or more of light intensity, temperature and algae density.

In an embodiment, the device further includes a reflective material or/and an artificial light source, which is disposed on the bottom and side surfaces of the culture plate and the microalgae liquid pool for irradiating the microalgae.

According to another aspect of the present disclosure, there is provided a method for adherent culture of microalgae using the device for adherent culture of microalgae in a thin liquid layer by mobile mechanical stirring described above, including:
inoculating a microalgae seed on the culture plate mounted in the microalgae liquid pool, and adding the culture solution, wherein the culture solution has a water layer with a depth in a range of 1~5 cm, which forms a thin liquid layer;
periodically moving the moving assembly of the subsystem for mechanical stirring on the guide rail, thereby the moving assembly driving the mechanical stirring assembly to stir and suspend the microalgae in the thin liquid layer, including the microalgae in a bottom layer of the thin liquid layer, every a set time, so that the microalgae in the thin liquid layer are irradiated by light; after stirring and suspending, the microalgae standing and gradually settling to the bottom, and are concentrated near the culture plate, thereby carrying out adherent culture in a cycle of suspension and settlement;
preparing a culture solution using water and nutrients and adding the culture solution to the microalgae liquid pool continuously or intermittently during the daytime, and a depth of the thin liquid layer being controlled in the range of 1~5 cm according to algae density, sunshine conditions and evaporation; and
not adding the culture solution at night.

In an embodiment, the method further includes:
concentrating and harvesting the microalgae, shielding and enclosing the microalgae liquid pool, ventilating and replenishing air to the microalgae liquid pool, cooling and heating the microalgae liquid pool, cleaning and disinfecting the microalgae liquid pool, treating and recycling the remaining culture solution and performing measurement and inspection, wherein:
when microalgae cells in the microalgae liquid reach a set density and are in a stage to be harvested, the microalgae liquid is concentrated by filtering and drainage to realize the harvesting of the algal cells, for performing concentrating and harvesting the microalgae;
the microalgae liquid pool is partially shielded, partially enclosed or completely enclosed, and the completely enclosed is that a glass cover or/and a transparent film is disposed on the microalgae liquid pool, or that a transparent glass room or a transparent plastic greenhouse is built outside the microalgae liquid pool, for performing shielding and enclosing the microalgae liquid pool;
air in the device for adherent culture of microalgae is exchanged by using a fan device and making water atomization, such that excessive high temperature in high temperature weather and high temperature period is reduced, and an excessive low temperature in the device for adherent culture of microalgae in a cold weather system is increased by using a heat source, for performing the ventilation, air replenishment, cooling and heating of the microalgae liquid pool.

In an embodiment, the method further includes assisting the mechanical stirring by means of bubble generation and ultrasonic so that the microalgae in the culture solution, including the microalgae in the bottom layer, are suspended.

In an embodiment, the method further includes directly using the bottom of the microalgae liquid pool as a culture plate.

Beneficial Effect

The method and the device for adherent culture of microalgae in a thin liquid layer by mobile mechanical stirring of the present disclosure completely solve the four main problems that restrict the high cost and low yield of microalgae production by using the thin liquid layer and the mobile mechanical stirring.

Specifically:
First, the present disclosure greatly reduces the power cost of microalgae culture, and can achieve so-called micro-power or extremely low power. The water body driven by the mobile mechanical stirring is very small, the suspension effect is good, the power consumption during moving stirring is very low, and the stirring cycle can be adjusted as needed. Compared with conventional methods, especially the micro-tubular type photo-reactor, the power consumption is only 1/5 or even 1/20. It is obvious that the production cost can be greatly reduced by using "ploughing" and "plowing" methods similar to traditional agriculture for microalgae culture.

Second, the present disclosure greatly reduces the cost of the device. The facilities (structures and materials thereof), equipments, members and consumables used in the present disclosure are mostly universal and cheap, they are durable, the manufacturing and maintenance methods are simple, the volume of the device for microalgae per unit yield only needs to be a fraction or even several tenths of that of conventional photo-reactors, so that the construction cost and use cost are both very low. Preliminary estimates indicate that the depreciation and maintenance costs are only 10~20% of that of the micro-tubular type photo-reactor.

Third, due to the short optical path and high concentration of nutrient solution, microalgae cells can continuously carry out efficient photosynthesis, which greatly improves the utilization efficiency of light energy, $CO_2$ and other nutrients, microalgae cells grow rapidly, the culture period is greatly shortened, and the density of algae in the water body is high, and the daily production of microalgae is much higher than that of conventional methods, reaching 10~300 $g/m^2 \cdot d$ (calculated according to the vertical projected area of the device), which is two to more than ten times that of conventional methods. The "adherent" of this method is not equivalent to "attachment" ("attachment" means that the microalgae are completely statically attached to the culture plate and not suspended in the water body). Although the biomass of the half-dry adherent culture method is also large, the light and nutrients in the method are not balanced, the quality of most microalgae cells is poor, and the proportion of high-value nutrients is very small. The method of the present disclosure overcomes the above-described essential defects of the half-dry adherent culture method, the microalgae cells in the system have sufficient and balanced light irradiation; the nutrient components are absorbed well, and the cells divide and grow vigorously; the water body acts as a solvent for various nutrients (including $CO_2$, inorganic salts), a transfer medium and a buffer system for regulating the environment (to stabilize environmental parameters such as pH, temperature, and osmotic pressure of the culture solution); the thin liquid layer also avoids photoinhibition caused by direct sunlight; accordingly, the production efficiency is high, the growth quality is good, and the proportion of high value-added products is large, so that the biological yield of high-quality microalgae per unit area can increase exponentially. In a good light irradiation environment, the biological yield of high-quality microalgae can reach 5 to 15 tons per mu per year.

Fourth, since the water body is small, the present disclosure reduces the consumption of water resources and nutrient salts, and reduces the cost in the collecting/drying step; meanwhile, since the water body is small, various stress conditions are easy to be added and removed, so that the growth state of cells is easy to be controlled; in addition, compared with conventional methods, because the water body is small and the density of algae is high, dry microalgae cells can be obtained by concentration methods such as stopping water replenishment and performing natural evaporation, and filtering and pumping water, and thus the problems of difficult harvesting and high drying energy consumption in conventional methods are solved, and the cost of concentration and harvesting can be greatly reduced.

Fifth, the culture period of the present disclosure is very short, which greatly reduces the chance of contamination and fungal infection. In addition, the microalgae liquid pool has a simple structure and is easy to operate, and is very convenient for cleaning and disinfection; the culture plate can be easily removed for cleaning and disinfection. Therefore, from the perspective of preventing pollution and infection, and cleaning and disinfection, the present disclosure also improves the quality and reduces the cost.

Sixth, the present disclosure can become a closed type microalgae culture system device by building a transparent glass room or a transparent plastic greenhouse on/outside one or a group of large-sized microalgae liquid pools, while the existing closed type photoreactors with small water body are all directly closed by a reactor wall and the closure cost is very high.

Seventh, the present disclosure has simple facilities and convenient layout, and can utilize natural systems and conditions such as tidal flats, slopes, and sea surfaces.

Therefore, the method and the device for adherent culture of microalgae in a thin liquid layer by mobile mechanical stirring of the present disclosure can completely realize low cost, high density, high efficiency and large-scale culture of various microalgae.

BRIEF DESCRIPTION OF THE DRAWINGS

Other objects and advantages of the present disclosure will become apparent and easy to understand from the following detailed description of exemplary embodiments with reference to the accompanying drawings. In the drawings:

FIG. 2 is a schematic diagram showing a perspective view of the device for adherent culture of microalgae in a thin liquid layer by mobile mechanical stirring of the present disclosure;

FIG. 3 is a schematic flow chart of the method for adherent culture of microalgae in a thin liquid layer by mobile mechanical stirring of the present disclosure.

DETAILED DESCRIPTION OF EMBODIMENTS

Figure 1:
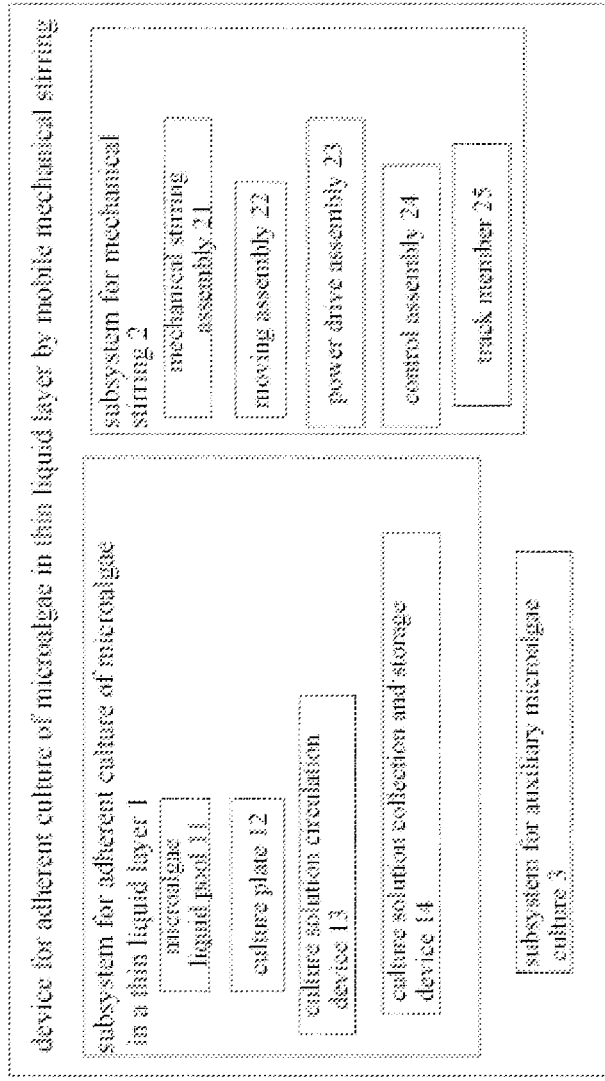
FIG. 1 is a schematic diagram showing a structural block diagram of the device for adherent culture of microalgae in a thin liquid layer by mobile mechanical stirring of the present disclosure.

In the following description, for the purposes of explanation, numerous specific details are set forth in order to provide a thorough understanding of one or more embodiments. It will be apparent, however, that the embodiments can be implemented without these specific details. In other examples, well-known structures and devices are shown in block diagram form in order to facilitate the description of one or more embodiments.

Various embodiments according to the present disclosure will be described in detail below with reference to the accompanying drawings.

FIG. 1 is a schematic diagram showing a structural block diagram of the device for adherent culture of microalgae in a thin liquid layer by mobile mechanical stirring of the present disclosure, and FIG. 2 is a schematic diagram showing a perspective view of the device for adherent culture of microalgae in a thin liquid layer by mobile mechanical stirring of the present disclosure. As shown in FIGS. 1 and 2, the device for adherent culture of microalgae includes:

a subsystem for adherent culture of microalgae in thin liquid layer 1, used for adherent culture of microalgae in a culture solution, and including an microalgae liquid pool 11 and a culture plate 12, wherein the culture plate 12 is used as a base plate for microalgae seed inoculation, adherent culture and microalgae harvesting, the microalgae liquid pool 11 accommodates the culture solution, and the culture solution has a water layer with a depth in the range of 1~5 cm, which forms a thin liquid layer, and preferably, the culture solution has a water layer with a depth in the range of 1~3 cm;

a subsystem for mechanical stirring 2, including a mechanical stirring assembly 21, a moving assembly 22, a power drive assembly 23, a control assembly 24 and a track member 25, the power drive assembly 23 may be a motor, and the control assembly 24 controls the power drive assembly 23 to move on the track member 25 to drive the mechanical stirring assembly to stir and suspend the microalgae, and after stirring, the microalgae stand and gradually settle to the bottom, so that the adherent culture may be realized in a cycle of suspension and settling.

Preferably, the above-described subsystem for adherent culture of microalgae in thin liquid layer 1 further includes a culture solution circulation device 13 including a device for transporting water and nutrients to the microalgae fluid pool 11, and filtering the remaining culture solution after the microalgae culture is completed and discharging it from the microalgae liquid pool 11; and a culture solution collection and storage device 14.

In addition, preferably, the culture plate 12 is mounted in the microalgae liquid pool 11 through a mounting frame, and the culture plate 12 includes a mounting member; the culture plate 12 is mounted on the mounting frame through the mounting member; the mounting frame is fixed on the microalgae liquid pool 11, and the microalgae is inoculated on the culture plate 12, which is beneficial to the suspension of microalgae. The culture plate 12 uses the bottom of the structure of the microalgae liquid pool 11. That is, the culture plate 12 is divided into two types, one is an independent loading and unloading type culture plate, which fixes the culture plate on the microalgae liquid pool through a mounting member, the material thereof is selected from one or more of glass, plexiglass, steel, aluminum alloy, plastic, waterproof rubber cloth and polymer fiber fabric material, and the other is a culture plate directly using a bottom plate structure of the microalgae liquid pool.

In an embodiment, the microalgae liquid pool 11 is a straight track microalgae liquid pool 11 including a straight pool track with a length-width ratio greater than 5, or the microalgae liquid pool 11 is a racetrack microalgae liquid pool 11 including two straight pool tracks with a length-width ratio greater than 5 and two turning tracks at ends thereof, or the microalgae liquid pool 11 is a circular pool.

Preferably, the width of the straight pool track of the microalgae liquid pool 11 is greater than or equal to 0.2 m, and preferably, the width of the straight pool track is 0.5~10 m.

In an embodiment, the structural material of the microalgae liquid pool 11 includes one or more of concrete, glass, plexiglass, steel, aluminum alloy, plastic, wood, waterproof rubber cloth and fiberglass board.

Preferably, the structural material of the microalgae liquid pool 11 is one or more of concrete, glass, plexiglass, stainless steel, plastic, wood and waterproof rubber cloth.

In an embodiment, the mechanical stifling assembly 21 includes one or both of a rotating blade stirring assembly and a fixed blade stirring assembly, the rotating blade stirring assembly includes a shaft 221 on which a blade group is mounted, rotation of the shaft 221 drives blades 222 of the blade group to rotate to realize stirring in a overturn form of microalgae in the microalgae liquid pool 11, and the fixed blade stifling assembly includes a shaft 221 and a blade group fixed on the shaft, and blades 222 of the blade group are in shovel shapes with size thereof increases from top to bottom, or a straight strip shape with the same size from top to bottom, and the shaft and the blade group on the shaft are driven by the moving assembly to realize stirring of microalgae in a horizontal propulsion form in the microalgae liquid pool; the shaft of the fixed blade stifling assembly is preferably non-rotating.

Preferably, the blades of the rotating blade stirring assembly and the fixed blade stifling assembly are provided with a plurality of holes, so that bubbles are generated when the blades are stirred, which increases the contact surface between the air and the microalgae liquid, and enable more $CO_2$ in the air to be dissolved in the microalgae liquid.

In an embodiment, the track member includes one or more of a guide rail, a rack and a chain, the moving assembly 22 includes one or more of a self-driven type moving assembly, a traction type moving assembly, and a rack/chain transmission type moving assembly, wherein, the self-driven type moving assembly includes a roller, a motor and a speed transmission device, the motor and the speed transmission device directly drive the roller to drive the mechanical stirring assembly 21 to move on the guide rail mounted on the microalgae liquid pool 11; the traction type moving assembly includes a traction belt, the traction belt pulls the mechanical stirring assembly to move or pulls the mechanical stirring assembly with a roller to roll on the guide rail through a windlass; the rack/chain transmission type moving assembly includes a motor, which drives the rack/chain and thereby drives the mechanical stirring assembly with a gear to move.

When the moving assembly 22 moves, the blades 222 of the rotating blade stirring assembly rotate at the same time, so that the microalgae in the thin liquid, including the microalgae in the bottom layer, are stirred and suspended; when the moving assembly 22 moves, the shovel-shaped blades 222 of the fixed blade stirring assembly are propelled horizontally so that the microalgae in the thin liquid, including the microalgae in the bottom layer, are stirred and suspended; wherein, the fixed blade stirring assembly may include a vertical fixed blade and a fixed blade with an inclined angle to propel the microalgae from different angles.

In the straight track microalgae liquid pool 11, the moving assembly 22 may perform a reciprocating periodic movement to stir the microalgae liquid pool 11 at regular intervals. Preferably, the fixed blades with an inclined angle include blades that are inclined forward with respect to the direction of movement and blades that are inclined backward with respect to the direction of movement. For example, half of the fixed blades with an inclined angle have a forward inclined angle according to the direction of movement, and the other half of the fixed blades have a backward inclined angle according to the direction of movement, and during the reciprocating movement, half of them always have a forward inclined angle according to the direction of movement.

In the racetrack microalgae liquid pool 11, the moving assembly 22 may perform a rotary periodic movement to stir the microalgae liquid pool 11 at regular intervals.

In the circular microalgae liquid pool 11, the moving assembly 22 performs a circular motion around the center of the circle to stir the microalgae liquid pool 11 at regular intervals.

In an embodiment, the control assembly 24 is used to control a movement speed of the moving assembly 22 and a stirring speed of the mechanical stirring assembly 21 according to set conditions, the set conditions include one or more of light intensity, temperature and algae density, for example, the movement speed of the moving assembly 22 and the rotation speed of the blades 222 are controlled according to conditions such as sunlight, temperature and algae density, so that the optimal condition required for the growth of microalgae cells can be achieved while controlling energy consumption.

In an embodiment, the device for adherent culture of microalgae further includes:
  an subsystem for auxiliary microalgae culture 3, including a inoculation device for microalgae seed inoculation, a filtration and drainage device for concentration and harvesting of microalgae liquid, a shielding device for shielding and enclosing of microalgae liquid pool 11, a fan device for ventilation and air replenishment of microalgae liquid pool 11, a water atomization device for cooling and heating of microalgae liquid pool 11, a cleaning device for cleaning and sterilizing of microalgae liquid pool 11, a purification device for treatment and recycling of remaining culture solution, and a detection device for measurement and inspection of microalgae fluid or/and culture solution.

The method for adherent culture of microalgae using the device for adherent culture of microalgae described above includes:
  in the culture process, inoculating the microalgae seed on the culture plate 12, the culture plate 12 is mounted in the microalgae liquid pool 11, and adding the culture solution, wherein the culture solution has a water layer with a depth in the range of 1~5 cm, which forms a thin liquid layer;
  periodically moving the moving assembly 22 of the subsystem for mechanical stirring 2 on the guide rail, thereby driving the mechanical stirring assembly 21 to stir and suspend the microalgae in the thin liquid layer, including the microalgae in the bottom layer, at regular intervals, so that the microalgae in the thin liquid layer can receive light irradiation for a certain period of time as needed every certain time; for the rest of the time after stirring and suspending, the microalgae stand and gradually settle to the bottom, and are concentrated near the culture plate, which is called adherent culture; the concentration and harvesting of microalgae, shielding and enclosing, ventilation and air replenishment, cooling and heating, and cleaning and disinfection of microalgae liquid pool, treatment and recycling of remaining culture solution, and measurement and inspection are completed by the subsystem for auxiliary microalgae culture 3.

In an embodiment, a reflective material or/and an artificial light source, which is disposed on the bottom and side surfaces of the culture plate 12 and the microalgae liquid pool 11 for irradiating the microalgae, is further included.

In an embodiment, a bubble generating device or/and an ultrasonic device is further included, the stirring is assisted by means of bubble generation and ultrasonic so that the microalgae in the thin liquid, including the microalgae in the bottom layer, are suspended, and thereby the microalgae can be illuminated for a certain period of time as needed at regular intervals.

FIG. 3 is a schematic flow chart of the method for adherent culture of microalgae in a thin liquid layer by mobile mechanical stirring of the present disclosure, and as shown in FIG. 3, the method for adherent culture of microalgae includes:
  Step S1, in the culture process, inoculating a microalgae seed on the culture plate 12, the culture plate 12 is mounted in the microalgae liquid pool 11, and adding the culture solution, wherein the culture solution has a water layer with a depth in the range of 1~5 cm, which forms a thin liquid layer;
  Step S2, periodically moving the moving assembly 22 of the subsystem for mechanical stirring 2 on the guide rail, thereby driving the mechanical stirring assembly 21 to stir and suspend the microalgae in the thin liquid layer, including the microalgae in the bottom layer, at regular intervals, so that the microalgae in the thin liquid layer can receive light irradiation for a certain period of time as needed every certain time; for the rest of the time after stirring and suspending, the microalgae stand and gradually settle to the bottom, and are concentrated near the culture plate, which is called adherent culture; that is, the adherent culture of microalgae is carried out in a cycle of suspension and settlement;
  Step S3, preparing a culture solution using water and nutrients and adding the culture solution to the microalgae liquid pool continuously or intermittently during the daytime, and a depth of the thin liquid layer being controlled in the range of 1~5 cm according to algae density, sunshine conditions and evaporation; and not adding the culture solution at night.

In an embodiment, the method for adherent culture of microalgae further includes:
  concentrating and harvesting the microalgae, shielding and enclosing the microalgae liquid pool 11, ventilating and replenishing air to the microalgae liquid pool, cooling and heating the microalgae liquid pool, cleaning and disinfecting the microalgae liquid pool, treating and recycling the remaining culture solution and performing measurement and inspection.

Inoculating is an approach and method that can make the microalgae cells exist in the culture plate, including but not limited to dilution, dispersion, immersion, spraying, coating and injection.

When microalgae cells in the microalgae liquid reach a certain density and are in a stage to be harvested, the microalgae liquid is concentrated by filtering and drainage to realize the harvesting of the microalgae cells, for performing the concentrating and harvesting the microalgae; further, after stopping the replenishment of fresh water to the microalgae culture system, the microalgae liquid is concentrated by utilizing sunlight irradiation and relying on the evaporation effect of water, so as to assist in the harvesting of microalgae cells.

As for the shielding and enclosing, a partial shielding/partial enclosing manner is adopted to reduce the impact of direct sunlight on the microalgae culture system in high temperature weather, and reduce the intrusion of bacteria, dust and insects into the system; a completely enclosed manner is adopted to reduce the intrusion of bacteria, dust and insects into the system, the completely enclosed manner includes but is not limited to adding a glass cover and a transparent film onto one or a group of microalgae liquid pools, or building a transparent glass room or transparent plastic greenhouse outside one or a group of microalgae liquid pools as a closed microalgae culture system device.

As for the ventilation, air replenishment, cooling and heating, the air in the system is exchanged by using a fan device and making water atomization in the closed microalgae culture system device; an excessive high temperature in high temperature weather and high temperature period is reduced, and an excessive low temperature in a colder weather system is increased by using a heat source.

In an embodiment, the method further includes:
assisting the mechanical stirring by means of bubble generation and ultrasonic so that the microalgae in the culture solution, including the microalgae in the bottom layer, are suspended.

In a specific embodiment of the present disclosure, the subsystem for adherent culture 1 is placed in a constructed closed and transparent glass room, the subsystem for adherent culture 1 includes 10 groups of stainless steel straight track microalgae liquid pools 11, the moving assembly includes a guide rail and a trolley, wherein the straight pool track has a net width of 1 m, a net length of 20 m and a height of 10 cm, and the guide rail is disposed on both sides thereof; 50 pieces of plexiglass culture plates 12 with a length of 1 m and a width of 40 cm are seamlessly spliced and laid on the bottom of each group of microalgae liquid pool 11, and are fixed by using the mounting frame of the culture plate 12; *Haematococcus pluvialis* microalgae species is sprayed on the culture plate 12 after being diluted with BG11 medium; prepare a microalgae culture solution using water and nutrients and adding the microalgae culture solution to the microalgae liquid pool 11 through the culture solution circulation device 13; during the daytime, the culture solution is continuously supplemented through the culture solution circulation device 13, and the depth of the water layer is controlled to 3~4 cm according to the sunshine conditions and evaporation; and at night, stop adding the culture solution. In the mechanical stirring assembly 21 of the subsystem for mechanical stirring 2, the stainless-steel main shaft 221 is about 1 m in length, and 20 groups of four-leaf stainless-steel blades 222 with a length of 5 cm and a width of 4 cm are provided on the shaft 221 at intervals of 1 cm. The shaft 221 is mounted on the trolley directly driven by the four-roller motor of the self-driven moving assembly through a bearing seat of the shaft 221, and a transmission and control mechanism is provided to rotate the shaft 221 and the blade 222. During the daytime, the four-wheeled trolley performs a reciprocating movement, the movement speed is 20~100 m/min, and the rotation speed of the blades 222 is 10~50 rpm, and the motion is stopped at night. The movement and rotation speed are adjusted to be slow first and then fast according to the culture cycle, and ensure that the microalgae in the thin liquid including the bottom layer are stirred and suspended to receive sufficient light irradiation. After culturing for 8~12 days under good light irradiation conditions, stop adding the culture solution, and open the drainage holes (not shown) on the side plate of the microalgae liquid pool 11 to slowly filter and drain the remaining culture solution, and meanwhile, the microalgae liquid is further concentrated to half-dry state using sunlight. Take out the culture plate 12, and the microalgae cells were harvested by using the subsystem for auxiliary microalgae culture 3 to measure the cell biomass and carotenoid content. The results show that (see Table 1, according to the annual culture of 200 days, the depreciation rate of 10%, and the comparison of *Haematococcus pluvialis* culture methods), compared with the horizontal microtubular photo-bioreactor, the biomass yield per unit area is increased by 200~600%, wherein the astaxanthin accounts for 3.5~4.8% of the total biomass of dry algae. There is a significant improvement compared with the racetrack pool system. Compared with the horizontal microtubule photo-bioreactor, the cost of the device is only 20~38%, the electricity cost is only 8~18%, and the culture period is only 27~40%. The ventilation and air supplement (mainly $CO_2$ gas) and the cooling and heating of the device are performed according to conventional procedures. The microalgae liquid pool 11, the culture plate 12, the culture solution circulation device 13, the blades 222 and all the parts of the device in direct contact with the microalgae liquid are cleaned and sterilized before and after culture.

TABLE 1

|  | Culture period d | Device cost depreciation Yuan/ton algae | Power consumption Yuan/ton algae (0.5 Yuan/KWH) | Microalgae production $g/m^2$ d | astaxanthin content % |
|---|---|---|---|---|---|
| microtubule | 25 | 48600 | 45000 | 5 | 2.8-3.9 |
| thin liquid layer | 8 | 9600-18500 | 3600-8100 | 15-35 | 3.5-4.8 |

In another specific embodiment, the a concrete racetrack microalgae liquid pool 11 of the subsystem for adherent culture of microalgae 1 is placed in a constructed transparent plastic greenhouse, wherein two straight pool tracks each has a net width of 1.5 m and a net length of 30 m and a height of 9 cm, and two turning tracks at the ends have a center turning radius of 5 m, and concrete steps on both sides are laid with plexiglass guide rails; 18 pieces of rubber cloth culture plates 12 with an average length of 5 m and a width of 1.5 m are cut out according to the shape of the microalgae liquid pool 11 and then spliced and laid on the bottom, and fixed by using a fixing sheet; *Chlorella* microalgae species is uniformly sprayed on the culture plate 12; prepare a microalgae culture solution using water and nutrients and adding the microalgae culture solution to the microalgae liquid pool 11 through the culture solution circulation device 13; during the daytime, the culture solution is continuously supplemented through the culture solution circulation device 13, and the depth of the water layer is controlled to 4~5 cm according to the sunshine conditions and evaporation; and at night, stop adding the culture solution. In the mechanical stirring assembly 21 of the subsystem for mechanical stirring 2, the length of the engineering plastic shaft 221 is slightly greater than 1.5 m, and 30 shovel-shaped plastic blades 222 having a length of 10 cm and a narrow top and a wide bottom are vertically mounted on the shaft 221 with a gap of 1~3 cm; pair of rollers are mounted at both ends of the shaft 221 and are driven by two small motors respectively, and the roller speed is adjusted on the turning track to realize differential rotation. During the daytime, the mobile mechanical stirring device takes 1~5 minutes for rotating one circle, and stops moving at night. The rotation speed is adjusted to be slow first and then fast according to the culture cycle, and ensure that the microalgae in the thin liquid including the bottom layer are stirred and suspended to receive sufficient light irradiation. After culturing for 2~3 days under good light irradiation conditions, stop adding the culture solution, and open the drainage holes (not shown) on the bottom of the microalgae liquid pool 11 to slowly filter and drain the remaining culture solution, and meanwhile, the microalgae liquid is further concentrated to half-dry state using sunlight. Take out the culture plate 12, and the microalgae cells were harvested by using the subsystem for auxiliary microalgae culture 3. The results show that (see Table 2, according to the annual culture of 200 days, the depreciation rate of 10%, and the comparison of chlorella culture methods), compared with the horizontal microtubular photo-bioreactor, the biomass yield per unit area and the protein content of microalgae dry weight are increased by 170~460% and 25~36%, respectively. There is a significant improvement compared with the open-type racetrack pool system. Compared with the horizontal microtubule photo-bioreactor, the cost of the device is only 20~31%, the electricity cost is only 9~15%, and the culture period is only 25%. The ventilation and air supplement (mainly $CO_2$ gas) and the cooling and heating of the device are performed according to conventional procedures. The microalgae liquid pool 11, the culture plate 12, the culture solution circulation device 13, the blades 222 and all the parts of the device in direct contact with the microalgae liquid are cleaned and sterilized before and after culture.

end of the stainless-steel rod has a roller which may roll on the guide rail. The steel rod forms an angle of 90 degrees with another steel rod; 200 shovel-shaped stainless-steel blades 222 with a length of 9 cm and a narrow top and a wide bottom are vertically mounted on each of the steel rods with a gap of 1~2 cm, and are sparsely arranged near the center of the circular pool and densely arranged near the outer periphery; the motor and the gearbox drive the main shaft 221 and drive the steel rods to rotate. During the daytime, the rotation speed is 0.2~5 revolutions per minute, and at night, the motion is stopped. The movement and rotation speed are adjusted to be slow first and then fast according to the culture cycle, and ensure that the microalgae in the thin liquid including the bottom layer are stirred and suspended to receive sufficient light irradiation. After culturing for 1~2 days under good light irradiation conditions, stop adding the culture solution, and open the drainage holes on the side plate of the microalgae liquid pool 11 to slowly filter and drain the remaining culture solution, and meanwhile, the microalgae liquid is further concentrated to half-dry state using sunlight. Take out the culture plate 12, and the microalgae cells were harvested by using the subsystem for auxiliary microalgae culture 3 to measure the cell biomass. The results show that, compared with the horizontal microtubular photo-bioreactor, the biomass yield per unit area and the protein content of microalgae dry weight are increased by 150~320% and 19~31%, respectively. There is a significant improvement compared with the open-type racetrack pool system. Compared with the horizontal microtubule photo-bioreactor, the cost of the device is only 20~28%, the electricity cost is only 9~16%, and the culture period is only

TABLE 2

|  | Culture period d | Device cost depreciation Yuan/ton algae | Power consumption Yuan/ton algae (0.5 Yuan/KWH) | Microalgae production g/m² d | Protein content % |
| --- | --- | --- | --- | --- | --- |
| microtubule | 8 | 16200 | 15000 | 20 | 55-65 |
| thin liquid layer | 2 | 3200-4800 | 1350-2500 | 54-112 | 68-80 |

In still another specific embodiment, a concrete circular microalgae liquid pool 11 of the subsystem for adherent culture of microalgae 1 is placed in a constructed closed and transparent glass room, wherein the circular pool has a diameter of 15 m and a height of 8 cm, and a guide rail is disposed on the peripheral wall of the circular pool; 120 pieces of plexiglass culture plates 12 are seamlessly spliced and laid on the bottom of the microalgae liquid pool 11, and fixed by using the mounting frame of the culture plate 12; spirulina algae is sprayed on the culture plate 12 after being diluted with a culture medium; prepare a microalgae culture solution using water and nutrients and adding the microalgae culture solution to the microalgae liquid pool 11 through the culture solution circulation device 13; during the daytime, the culture solution is continuously supplemented through the culture solution circulation device 13, and the depth of the water layer is controlled to 3~4 cm according to the sunshine conditions and evaporation; and at night, stop adding the culture solution. A main shaft 221, a motor and a speed transmission device are mounted in the center. Four stainless-steel rods are provided in the mechanical stirring assembly 21 of the subsystem for mechanical stirring 2, each of which has a length of 15 m, and one end of the stainless-steel rod is connected to the main shaft 221, and the other 20~25%. The ventilation and air supplement (mainly $CO_2$ gas) and the cooling and heating of the system are performed according to conventional procedures. The microalgae liquid pool 11, the culture plate 12, the culture solution circulation device 13, the blades 222 and all the parts of the device in direct contact with the microalgae liquid are cleaned and sterilized before and after culture.

In the above embodiments, when the used microalgae species are respectively replaced by *Pseudo-Nicochloropsis, Spirulina, Scenedesmus, Chlorella, Haematococcus pluvialis, Phaeodactylum tricornutum, Chrysophyceae, Dunaliella*, etc., the obtained results are similar, the description will not be repeated for the sake of brevity.

Although the foregoing disclosure shows exemplary embodiments of the present disclosure, it should be noted that various changes and modifications can be made without departing from the scope as defined by the appended claims. The functions, steps and/or operations of the method claims in accordance with the embodiments described herein need not be performed in any particular order. Furthermore, although elements of the present disclosure may be described or claimed in individual form, it is also contemplated that there are a plurality of elements unless explicitly limited to a single element.

What is claimed is:

1. A device for adherent culture of microalgae in a thin liquid layer by mobile mechanical stirring, comprising:
   a subsystem for adherent culture of microalgae in a thin liquid layer, used for adherent culture of microalgae in culture solution, and comprising a microalgae liquid pool and a culture plate, wherein the culture plate is used as a base plate for microalgae seed inoculation, adherent culture and microalgae harvesting, the microalgae liquid pool accommodates the culture solution, and the culture solution has a water layer with a depth in a range of 1~5 cm, which forms the thin liquid layer; and
   a subsystem for mechanical stirring, comprising a mechanical stirring assembly, a moving assembly, a track member, a power driver and a controller, the moving assembly moves on the track member to drive the mechanical stirring assembly to stir and suspend the microalgae, and the microalgae stand and gradually settle to bottom after stirring, thereby realizing adherent culture in a cycle of suspension and settlement,
   wherein the mechanical stirring assembly includes one or both of a rotating blade stirring assembly and a fixed blade stirring assembly,
   wherein the rotating blade stirring assembly comprises a shaft on which a blade group is mounted, rotation of the shaft drives blades of the blade group to rotate to realize stirring in an overturn form of the microalgae in the microalgae liquid pool,
   wherein the fixed blade stirring assembly comprises a shaft and a blade group fixed on the shaft, and blades of the blade group are in shovel shapes with size thereof increases from top to bottom, or a straight strip shape with the same size from top to bottom, and the shaft and the blade group on the shaft are driven by the moving assembly to realize stirring of microalgae in a horizontal propulsion form in the microalgae liquid pool,
   wherein the track member includes one or more of a guide rail, a rack and a chain, the moving assembly includes one or more of a self-driven moving assembly, a traction moving assembly and a rack/chain transmission moving assembly,
   wherein, the self-driven moving assembly comprises a roller, a motor and a speed transmitter the motor and the speed transmitter directly drive the roller to drive the mechanical stirring assembly to move on the guide rail mounted on the microalgae liquid pool,
   wherein, the traction moving assembly comprises a traction belt, the traction belt pulls the mechanical stirring assembly to move or pulls the mechanical stirring assembly with a roller to roll on the guide rail through a windlass,
   wherein, the rack/chain transmission moving assembly comprises a motor, which drives the rack/chain and thereby drives the mechanical stirring assembly with a gear to move, and
   wherein the controller is used to control a movement speed of the moving assembly and a stirring speed of the mechanical stirring assembly according to set conditions, and the set conditions include one or more of light intensity, temperature and microalgae density.

2. The device for adherent culture of microalgae of claim 1, further comprising:
   a subsystem for auxiliary microalgae culture, comprising an inoculator for microalgae seed inoculation, a filter drain for concentration and harvesting of microalgae liquid, a masker for shielding and enclosing of the microalgae liquid pool, a fan device for ventilation and air replenishment of the microalgae liquid pool, a water atomizer for cooling and heating of the microalgae liquid pool, a cleaner for cleaning and sterilizing of the microalgae liquid pool, a purifier for treatment and recycling of remaining culture solution, and a detector for measurement and inspection of the microalgae liquid or/and the culture solution.

3. The device for adherent culture of microalgae of claim 1, wherein the microalgae liquid pool is a straight track microalgae liquid pool which includes a straight pool track with a length-width ratio greater than 5, or
   wherein the microalgae liquid pool is a racetrack microalgae liquid pool which includes two straight pool tracks with a length-width ratio greater than 5 and two turning tracks at ends thereof, or
   wherein the microalgae liquid pool is a circular pool.

4. The device for adherent culture of microalgae of claim 1, wherein structural material of the microalgae liquid pool includes one or more of concrete, glass, plexiglass, steel, aluminum alloy, plastic, wood, waterproof rubber cloth and fiberglass board, and
   wherein the culture plate is divided into two types, one is an independent loading and unloading culture plate, which fixes the culture plate on the microalgae liquid pool through a mounting member, the material thereof is selected from one or more of glass, plexiglass, steel, aluminum alloy, plastic, waterproof rubber cloth and polymer fiber fabric material, and the other is a culture plate directly using a bottom plate structure of the microalgae liquid pool.

5. The device for adherent culture of microalgae of claim 1, further comprising reflective material or/and an artificial light source, which is disposed on bottom and side surfaces of the culture plate and the microalgae liquid pool for irradiating the microalgae.

* * * * *